(12) United States Patent
Takubo et al.

(10) Patent No.: US 11,959,519 B2
(45) Date of Patent: Apr. 16, 2024

(54) PRELOAD INSPECTION METHOD AND ASSEMBLY METHOD FOR BEARING DEVICE FOR VEHICLE WHEEL

(71) Applicant: NTN Corporation, Osaka (JP)

(72) Inventors: Takayasu Takubo, Shizuoka (JP); Takayuki Owada, Shizuoka (JP); Akihiko Katayama, Shizuoka (JP)

(73) Assignee: NTN CORPORATION, Osaka (JP)

( * ) Notice: Subject to any disclaimer, the term of this patent is extended or adjusted under 35 U.S.C. 154(b) by 310 days.

(21) Appl. No.: 17/434,793

(22) PCT Filed: Feb. 28, 2020

(86) PCT No.: PCT/JP2020/008355
§ 371 (c)(1),
(2) Date: Aug. 30, 2021

(87) PCT Pub. No.: WO2020/179670
PCT Pub. Date: Sep. 10, 2020

(65) Prior Publication Data
US 2022/0136562 A1  May 5, 2022

(30) Foreign Application Priority Data
Mar. 4, 2019  (JP) .................................. 2019-038630

(51) Int. Cl.
*F16C 43/04* (2006.01)
*F16C 19/18* (2006.01)
(Continued)

(52) U.S. Cl.
CPC .............. *F16C 43/04* (2013.01); *F16C 19/18* (2013.01); *F16C 25/08* (2013.01); *F16C 33/78* (2013.01); *G01L 5/26* (2013.01)

(58) Field of Classification Search
CPC ............................. F16C 43/04; F16C 2226/52
See application file for complete search history.

(56) References Cited

U.S. PATENT DOCUMENTS 5,597,965 A * 1/1997 Endo .................. G01M 13/045
73/862.49
6,070,325 A   6/2000 Miyata et al.
(Continued)

FOREIGN PATENT DOCUMENTS

JP    10-185717    7/1998
JP    11-44319     2/1999
(Continued)

OTHER PUBLICATIONS

International Search Report dated Mar. 31, 2020 in International (PCT) Application No. PCT/JP2020/008355.
(Continued)

*Primary Examiner* — Kyle A Cook
(74) *Attorney, Agent, or Firm* — Wenderoth, Lind & Ponack, L.L.P.

(57) ABSTRACT

A preload inspection method for a bearing device for a vehicle wheel comprises: a first bearing preload value calculation step for calculating a first bearing preload value; a first rotating torque measurement step for measuring a first rotating torque; a caulking step for swaging the small-diameter stepped part to the inner ring; a second bearing preload value calculation step for calculating a second bearing preload value; a second rotational torque measurement step for measuring a second rotational torque; a third bearing preload value calculation step for calculating a third bearing preload value by adding, to the first bearing preload value, a preload change amount based on a differential torque between the first rotating torque and the second rotating torque; and a determination step for determining the suitability of the preload from the second bearing preload value and the third bearing preload value.

5 Claims, 9 Drawing Sheets

(51) Int. Cl.
      *F16C 25/08*       (2006.01)
      *F16C 33/78*       (2006.01)
      *G01L 5/26*        (2006.01)

(56) References Cited

U.S. PATENT DOCUMENTS

| | | | |
|---|---|---|---|
| 6,491,440 B1* | 12/2002 | Sahashi | F16C 19/184 |
| | | | 384/544 |
| 6,796,031 B1 | 9/2004 | Russell | |
| 2004/0177509 A1 | 9/2004 | Russell | |
| 2011/0053696 A1 | 3/2011 | Umekida et al. | |
| 2011/0219886 A1* | 9/2011 | Wickens | F16C 25/06 |
| | | | 73/862.55 |
| 2016/0001597 A1* | 1/2016 | Komori | F16C 33/60 |
| | | | 384/544 |
| 2016/0069394 A1 | 3/2016 | Ogata | |
| 2018/0087569 A1* | 3/2018 | Inoue | F16C 19/186 |

FOREIGN PATENT DOCUMENTS

| | | |
|---|---|---|
| JP | 2002-333016 | 11/2002 |
| JP | 2006-052801 | 2/2006 |

OTHER PUBLICATIONS

Office Action dated Sep. 27, 2022, in corresponding Indian Patent Application No. 202117043873.

\* cited by examiner

PRELOAD INSPECTION METHOD AND ASSEMBLY METHOD FOR BEARING DEVICE FOR VEHICLE WHEEL

TECHNICAL FIELD

The present invention relates to a preload inspection method and an assembly method for a bearing device for a vehicle wheel.

BACKGROUND ART

Conventionally, a bearing device for a vehicle wheel that rotatably supports a wheel in a suspension device of an automobile or the like is known. In such a bearing device for a vehicle wheel, a preload is applied between a rolling body and a raceway ring constituting the bearing device.

As a preload is applied to the bearing device, rigidity of the bearing device can be increased, and vibration and noise can be suppressed. However, if a preload is excessively applied, it may cause an increase in the rotational torque and a decrease in the life. Therefore, it is important to check whether an appropriate preload is applied to the bearing device.

As a method of checking a preload applied to the bearing device, for example, as disclosed in Patent Literature 1, a preload measurement method, in which a preload gap in an axial direction in a rolling bearing provided with rolling bodies in a plurality of rows is measured to measure a preload applied to the bearing, is known.

CITATIONS LIST

Patent Literature

Patent Literature 1: JP-A 10-185717 Gazette

SUMMARY OF INVENTION

Technical Problems

In the preload measurement method disclosed in Patent Literature 1, it is possible to measure a preload applied to a bearing. However, in recent years, since there has been an increasing demand for lower fuel consumption in automobiles and the like to which a bearing device for a vehicle wheel is attached, further improvement has been desired in order to check a preload applied to the bearing device with higher accuracy.

In view of the above, an object of the present invention is to provide a preload inspection method and an assembly method for a bearing device for a vehicle wheel, in which a preload applied to the bearing device for a vehicle wheel can be checked with higher accuracy.

Solutions to Problems

That is, according to the preload inspection method for a bearing device for a vehicle wheel of the present invention, there is provided a preload inspection method for a bearing device for a vehicle wheel including an outer member having a plurality of rows of outer raceway surfaces on an inner periphery, an inner member including a hub ring that has a small-diameter step portion extending in an axial direction on an outer periphery and an inner ring that is press-fitted into the small-diameter step portion of the hub ring, the inner member having a plurality of rows of inner raceway surfaces facing the plurality of rows of outer raceway surfaces, and a plurality of rows of rolling bodies rollably accommodated between both raceway surfaces of the outer member and the inner member. The preload inspection method includes a press-fitting step of press-fitting the inner ring into the small-diameter step portion of the hub ring to a position where the inner ring abuts on the hub ring in the axial direction, a first bearing preload value calculation step of calculating a first bearing preload value of the bearing device for a vehicle wheel based on a first axial negative gap between the inner ring and the hub ring after the press-fitting step, a first rotational torque measurement step of measuring a first rotational torque of the bearing device for a vehicle wheel when the inner member and the outer member are relatively rotated after the press-fitting step, a caulking step of caulking an inner-side end portion of the small-diameter step portion to the inner ring after the first rotational torque measurement step, a second bearing preload value calculation step of calculating a second bearing preload value of the bearing device for a vehicle wheel based on a second axial negative gap between the inner ring and the hub ring after the caulking step, a second rotational torque measurement step of measuring a second rotational torque of the bearing device for a vehicle wheel when the inner member and the outer member are relatively rotated after the caulking step, a third bearing preload value calculation step of calculating a third bearing preload value by adding, to the first bearing preload value, a preload change amount between after the press-fitting step and after the caulking step, the preload change amount being obtained based on a differential torque between the first rotational torque and the second rotational torque, and a determination step of determining appropriateness/inappropriateness of a preload applied to the bearing device for a vehicle wheel depending on whether or not a difference between the second bearing preload value and the third bearing preload value is equal to or less than a predetermined threshold.

Advantageous Effects of Invention

As advantageous effects of the present invention, effects described below are obtained.

That is, according to the present invention, a preload value of a bearing device for a vehicle wheel can be verified with higher accuracy as compared with a case where only a preload value calculated based on an axial gap is used.

DESCRIPTION OF EMBODIMENTS

[Bearing Device for Vehicle Wheel]

Hereinafter, a bearing device for a vehicle wheel 1 as a first embodiment of a bearing device for a vehicle wheel for which the preload inspection method according to the present invention is performed will be described with reference to FIG. 1.

Figure 1:
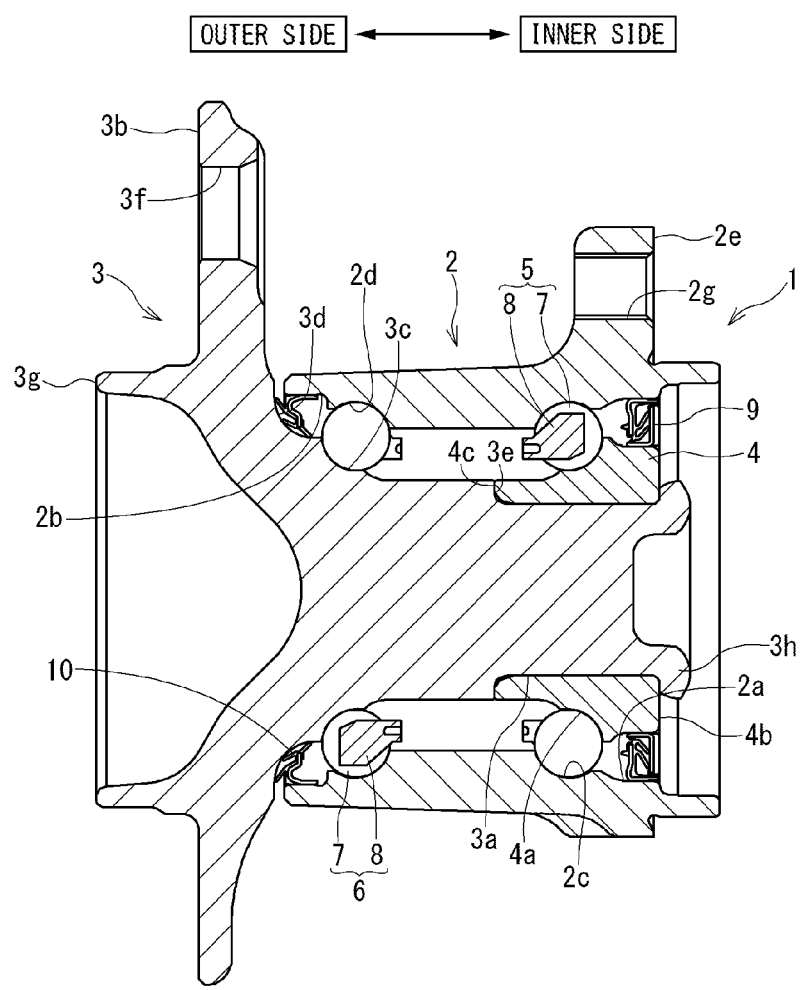
FIG. 1 is a side cross-sectional view illustrating a bearing device for a vehicle wheel in which a preload inspection method is performed.

The bearing device for a vehicle wheel 1 illustrated in FIG. 1 rotatably supports a wheel in a suspension device of a vehicle such as an automobile. The bearing device for a vehicle wheel 1 has a "third generation" configuration, and includes an outer ring 2 that is an outer member, a hub ring 3 and an inner ring 4 that are inner members, two rows of an inner-side ball row 5 and an outer-side ball row 6 that are rolling rows, and an inner-side seal member 9 and an outer-side seal member 10. Here, "inner side" represents the vehicle body side of the bearing device for a vehicle wheel 1 when attached to a vehicle body, and "outer side" represents the wheel side of the bearing device for a vehicle wheel 1 when attached to the vehicle body. Further, the axial direction represents a direction along a rotation axis of the bearing device for a vehicle wheel 1.

An inner-side opening portion 2a to which the inner-side seal member 9 can be fitted is formed in an inner-side end portion of the outer ring 2. An outer-side opening portion 2b to which the outer-side seal member 10 can be fitted is formed in an outer-side end portion of the outer ring 2. An outer raceway surface 2c on the inner side and an outer raceway surface 2d on the outer side are formed on the inner peripheral surface of the outer ring 2. A vehicle body mounting flange 2e for mounting the outer ring 2 on a vehicle body side member is integrally formed on the outer peripheral surface of the outer ring 2. The vehicle body mounting flange 2e is provided with a bolt hole 2g into which a fastening member (here, a bolt) for fastening the vehicle body side member and the outer ring 2 is inserted.

In an inner-side end portion of the hub ring 3, a small-diameter step portion 3a whose diameter is smaller than that of an outer-side end portion is formed on the outer peripheral surface. A shoulder portion 3e is formed in an outer-side end portion of a small-diameter step portion 3a of the hub ring 3. A vehicle wheel mounting flange 3b for mounting a wheel is integrally formed in an outer-side end portion of the hub ring 3. The vehicle wheel mounting flange 3b is provided with a bolt hole 3f into which a hub bolt for fastening the hub ring 3 and a wheel or a brake component is press-fitted.

The hub ring 3 is provided with an inner raceway surface 3c on the outer side in a manner facing the outer raceway surface 2d on the outer side of the outer ring 2. A lip sliding surface 3d with which the outer-side seal member 10 comes into sliding contact is formed on the base portion side of the vehicle wheel mounting flange 3b of the hub ring 3. The outer-side seal member 10 is fitted to an outer-side opening end of an annular space formed by the outer ring 2 and the hub ring 3. The hub ring 3 has an outer-side end surface 3g in an end portion further on the outer side than the vehicle wheel mounting flange 3b.

The inner ring 4 is provided on the small-diameter step portion 3a of the hub ring 3. The inner ring 4 is fixed to the small-diameter step portion 3a of the hub ring 3 by press-fitting and caulking. The inner ring 4 applies a preload to the inner-side ball row 5 and the outer-side ball row 6 which are rolling rows. The inner ring 4 has an inner-side end surface 4b in an inner-side end portion, and an outer-side end surface 4c in an outer-side end portion. A caulked portion 3h caulked to the inner-side end surface 4b of the inner ring 4 is formed in an inner-side end portion of the hub ring 3.

An inner raceway surface 4a is formed on the outer peripheral surface of the inner ring 4. That is, the inner ring 4 forms the inner raceway surface 4a on the inner side of the hub ring 3. The inner raceway surface 4a of the inner ring 4 faces the inner-side outer raceway surface 2c of the outer ring 2.

The inner-side ball row 5 and the outer-side ball row 6, which are rolling rows, are configured in a manner that a plurality of balls 7, which are rolling bodies, are held by a cage 8. The inner-side ball row 5 is rollably sandwiched between the inner raceway surface 4a of the inner ring 4 and the outer raceway surface 2c on the inner side of the outer ring 2. The outer-side ball row 6 is rollably sandwiched between the inner raceway surface 3c of the hub ring 3 and the outer raceway surface 2d on the outer side of the outer ring 2.

In the bearing device for a vehicle wheel 1, the outer ring 2, the hub ring 3 and the inner ring 4, the inner-side ball row 5, and the outer-side ball row 6 constitute a double row angular contact ball bearing. Note that the bearing device for a vehicle wheel 1 may be configured by a double row tapered roller bearing.

[Preload Inspection Method]

Figure 2:
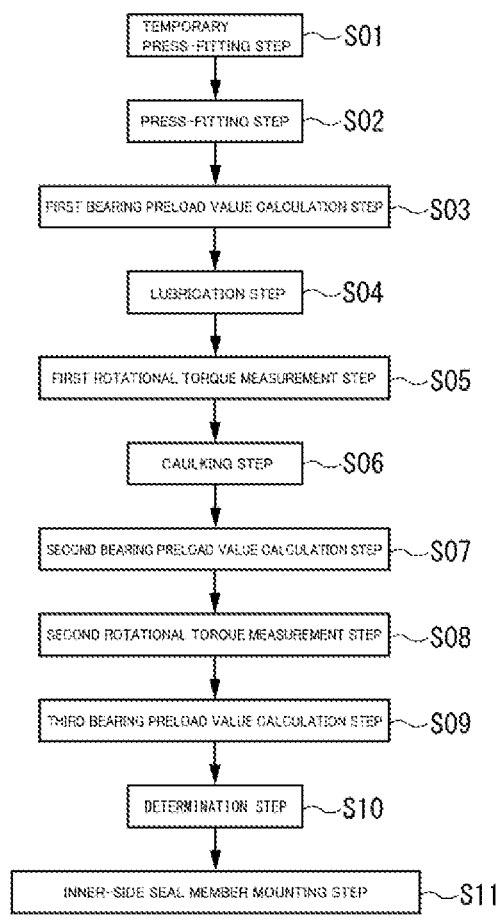
FIG. 2 is a diagram illustrating a process of the preload inspection method.

Next, the preload inspection method of the bearing device for a vehicle wheel 1 will be described. As illustrated in FIG. 2, the preload inspection method in the present embodiment is performed during assembly of the bearing device for a vehicle wheel 1. Specifically, the preload inspection method includes a temporary press-fitting step (S01), a press-fitting step (S02), a first bearing preload value calculation step (S03), a lubrication step (S04), a first rotational torque measurement step (S05), a caulking step (S06), a second bearing preload value calculation step (S07), a second rotational torque measurement step (S08), a third bearing preload value calculation step (S09), a determination step (S10), and an inner-side seal member mounting step (S11). Each step of the preload inspection method will be described below.

(Temporary Press-Fitting Step)

Figure 3:
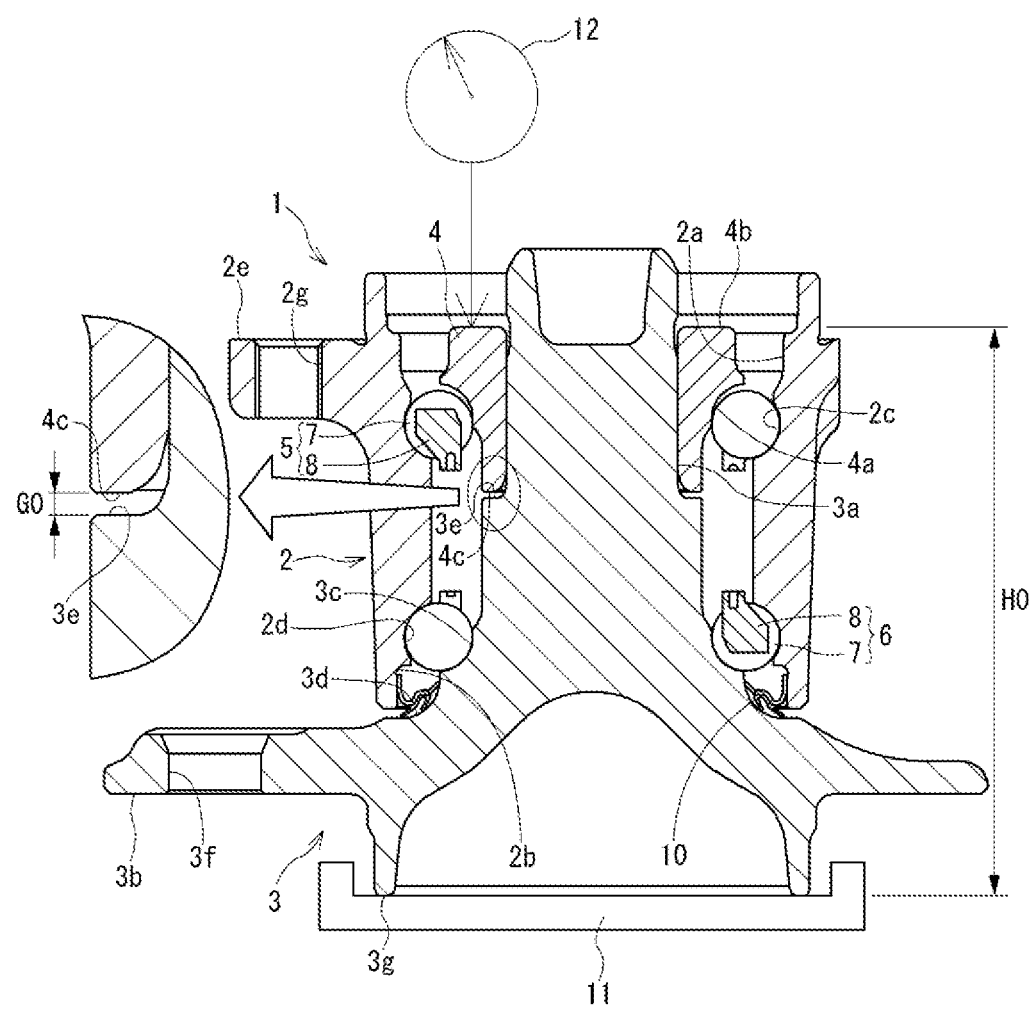
FIG. 3 is a side cross-sectional view illustrating the bearing device for a vehicle wheel in a state where an inner ring is temporarily press-fitted into a small-diameter step portion of a hub ring.

As shown in FIG. 3, the hub ring 3 is placed on a support base 11 in a posture in which the axial direction is the vertical direction and the outer-side end surface 3g is positioned downward. The outer-side end surface 3g of the hub ring 3 is grounded to the support base 11. The outer ring 2 is rotatably mounted on the hub ring 3 placed on the support base 11 via the inner-side ball row 5 and the outer-side ball row 6. The outer-side seal member 10 is fitted to an outer-side end portion of the outer ring 2. A space between the hub ring 3 and the outer ring 2 is filled with grease.

In the temporary press-fitting step (S01), first, the inner ring 4 is temporarily press-fitted into the small-diameter step portion 3a of the hub ring 3 placed on the support base 11.

The temporary press-fitting of the inner ring 4 is performed by press-fitting the inner ring 4 into the small-diameter step portion 3a from above and stopping the press-fitting before the outer-side end surface 4c of the inner ring 4 abuts on the shoulder portion 3e of the hub ring 3. Here, the press-fitting work of the inner ring 4 is performed in a state where a predetermined pressure is applied using a pushing device such as a hydraulic cylinder or an air cylinder, for example. At a time point at which the temporary press-fitting of the inner ring 4 is completed, an axial positive gap G0 exists between the outer-side end surface 4c of the inner ring 4 and the shoulder portion 3e of the hub ring 3. Note that the axial positive gap G0 has a predetermined value set in advance before the inner ring 4 is temporarily press-fitted using the pushing device.

In the temporary press-fitting step (S01), the axial positive gap G0 and an axial dimension H0 between the outer-side end surface 3g of the hub ring 3 and the inner-side end surface 4b of the inner ring 4 after the temporary press-fitting of the inner ring 4 are measured. The axial dimension H0 can be measured by a measuring instrument 12 such as a dial gauge.

(Press-Fitting Step)

Figure 4:
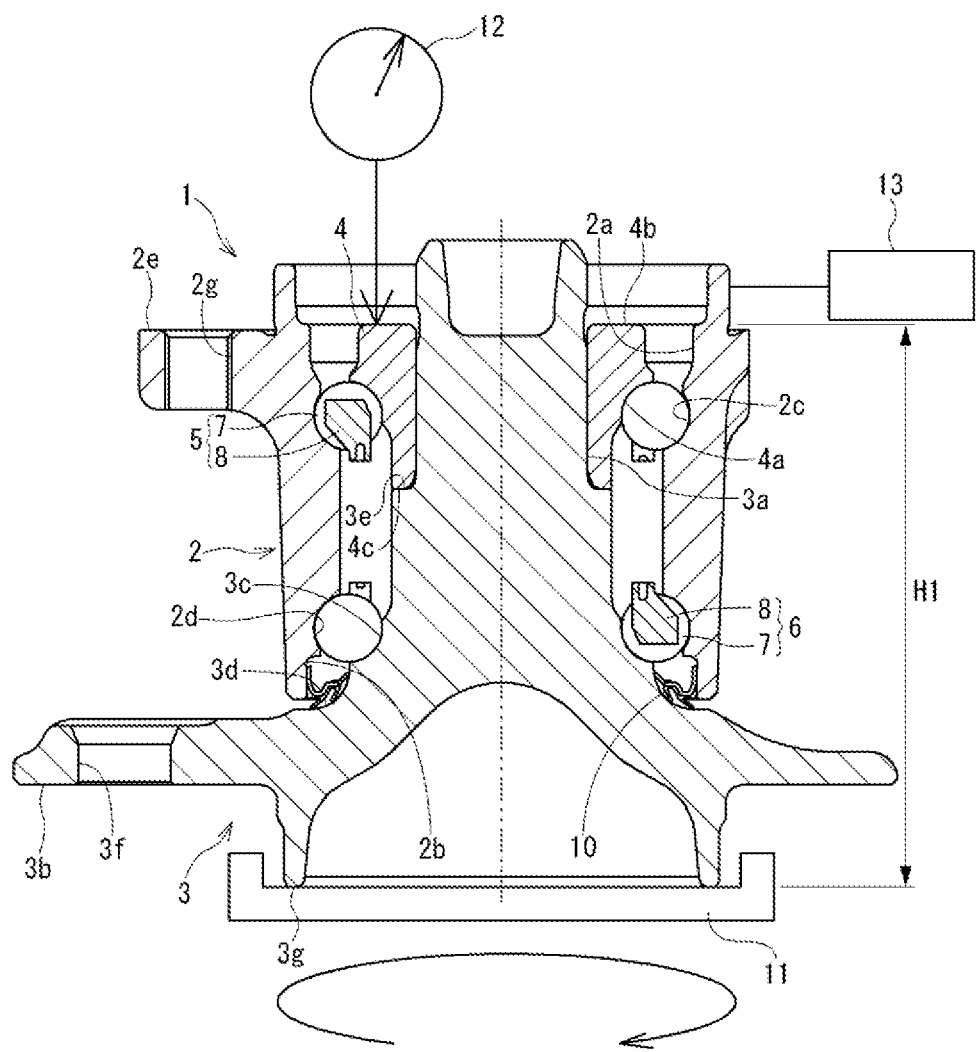
FIG. 4 is a side cross-sectional view illustrating the bearing device for a vehicle wheel in a state where the inner ring is press-fitted into the small-diameter step portion of the hub ring.

After the temporary press-fitting step (S01), the press-fitting step (S02) is performed. As shown in FIG. 4, in the press-fitting step (S02), the inner ring 4 is press-fitted into the small-diameter step portion 3a to a position where the outer-side end surface 4c of the inner ring 4 abuts on the shoulder portion 3e of the hub ring 3. After the press-fitting of the inner ring 4 into the small-diameter step portion 3a is completed, an axial dimension H1 between the outer-side end surface 3g of the hub ring 3 and the inner-side end surface 4b of the inner ring 4 after the press-fitting of the inner ring 4 is measured. Further, a value obtained by subtracting the axial dimension H1 from the axial dimension H0 is subtracted from the axial positive gap G0 to obtain a first axial negative gap G1 between the inner ring 4 and the hub ring 3 after the press-fitting of the inner ring 4 (G1=G0−(H0−H1)).

(First Bearing Preload Value Calculation Step)

The first bearing preload value calculation step (S03) is performed after the press-fitting step (S02). In the first bearing preload value calculation step (S03), a first bearing preload value P1 applied to the bearing after the press-fitting step is calculated based on the first axial negative gap G1. The first bearing preload value P1 is calculated by applying the first axial negative gap G1 to a relationship between an axial negative gap and a bearing preload value in the bearing device for a vehicle wheel 1 which has been obtained, in advance, by an experiment or the like. Note that the relationship between an axial negative gap and a bearing preload value can be obtained for each specification of the bearing device for a vehicle wheel 1.

(Lubrication Step)

The lubrication step (S04) is performed after the first bearing preload value calculation step (S03). In the lubrication step (S04), the hub ring 3 into which the inner ring 4 is press-fitted and the outer ring 2 are relatively rotated, so that the balls 7 of the inner-side ball row 5 and the outer-side ball row 6 are lubricated with the grease with which a space between the hub ring 3 and the outer ring 2 is filled. In the lubrication step (S04), the hub ring 2 may be rotated while the outer ring 2 is fixed, or the outer ring 2 may be rotated while the hub ring 3 is fixed.

By performing the lubrication step (S04), the resistance generated between the grease and the ball 7 can be made constant when the hub ring 3 and the outer ring 2 are relatively rotated. In this manner, when the rotational torque of the bearing device for a vehicle wheel 1 is measured in the first rotational torque measurement step (S05) and the second rotational torque measurement step (S08) that are performed later, it is possible to suppress variations in the measured rotational torque.

(First Rotational Torque Measurement Step)

The first rotational torque measurement step (S05) is performed after the lubrication step (S04). In the first rotational torque measurement step (S05), a torque measuring device 13 measures a first rotational torque Ta when the hub ring 3 with the inner ring 4 press-fitted into the small-diameter step portion 3a and the outer ring 2 are relatively rotated. In the first rotational torque measurement step (S05), the hub ring 3 may be rotated while the outer ring 2 is fixed, or the outer ring 2 may be rotated while the hub ring 3 is fixed.

In a case where the hub ring 3 is rotated, the revolution speed of the balls 7 in the inner-side ball row 5 and the outer-side ball row 6 becomes lower than that in a case where the outer ring 2 is rotated, and the variation in the rotational torque value measured when the rotational speed of the hub ring 3 changes becomes small. Therefore, it is preferable to rotate the hub ring 3 in the rotational torque measurement step. Note that, in a case where the hub ring 3 is rotated, the hub ring 3 can be rotated by rotating the support base 11 on which the hub ring 3 is placed.

Figure 5:
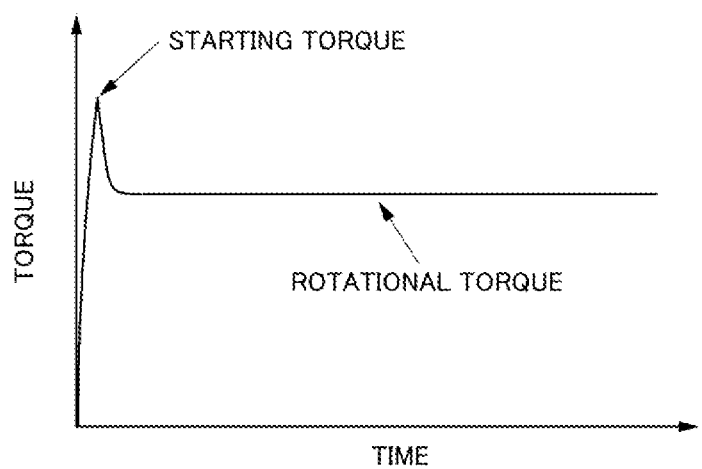
FIG. 5 is a diagram illustrating a relationship between time and torque when the hub ring and an outer ring are relatively rotated.

Further, in the first rotational torque measurement step (S05), not the starting torque of the bearing but the rotational torque is measured. As illustrated in FIG. 5, the starting torque, which is a peak value of the initial motion torque when the rotation of the bearing is started, decreases with the lapse of time, and has a large temporal change. Therefore, the repetitive reproducibility is poor. In contrast, the rotational torque is a torque after the bearing starts rotating, and shows a constant value with a small temporal change. Therefore, in the first rotational torque measurement step (S05), the torque value of the bearing can be measured with high accuracy by measuring the first rotational torque Ta which is the rotational torque.

Figure 6:
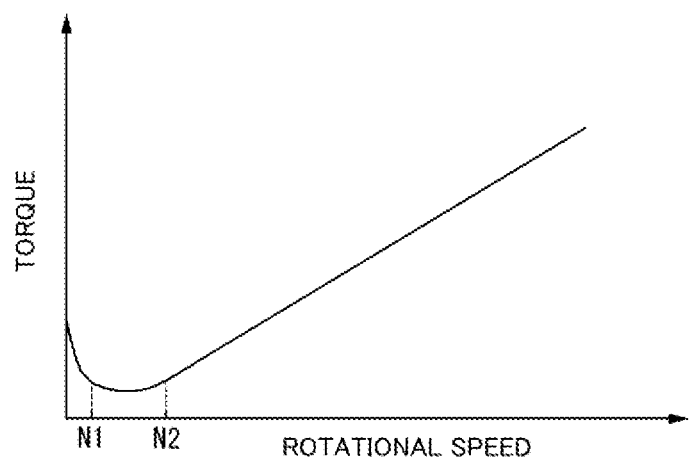
FIG. 6 is a diagram illustrating a relationship between a rotational speed and torque when the hub ring and the outer ring are relatively rotated.

As shown in FIG. 6, the rotational torque of the bearing when the hub ring 3 and the outer ring 2 are relatively rotated, which increases as the rotational speed increases in a range where the rotational speed of the hub ring 3 or the outer ring 2 is equal to or more than a certain value, decreases as the rotational speed increases when the rotational speed of the hub ring 3 or the outer ring 2 is extremely low, and then turns to increase. That is, there is a region where the rotational torque of the bearing changes from decreasing to increasing as the rotational speed increases, and in the region, the degree of fluctuation of the rotational torque with respect to a change in the rotational speed is small.

In the first rotational torque measurement step (S05), the hub ring 3 or the outer ring 2 is rotated at a constant rotational speed so that the measured rotational torque does not vary. Further, the rotational speed of the hub ring 3 or the outer ring 2 is set in a range of rotational speeds N1 to N2 in a region where the rotational torque changes from decreasing to increasing. In this manner, even if the rotational speed changes during the measurement of the first rotational torque Ta, the fluctuation of the rotational torque can be reduced.

In the first rotational torque measurement step (S05), the rotational torque is measured in a state where a dynamic frictional force is generated between the inner members 3 and 4 and the outer member 2. Specifically, the rotational torque is measured in a state where a dynamic frictional force is generated between the inner members 3 and 4 and the rolling bodies 7, between the hub ring 3 and the outer-side seal member 10, and between the outer ring 2 and the rolling bodies 7 and the outer-side seal member 10. In general, since a coefficient of dynamic friction is smaller than a coefficient of static friction and has a small variation, the rotational torque can be measured with high accuracy.

In the present embodiment, the rotational speed N1, which is a lower limit value of the range of the rotational speed, is set to 2 rotations/min at which the rotational torque can be measured in a state where a dynamic frictional force is generated. The rotational speed N2, which is an upper limit value of the range of the rotational speed, is set to 60 rotations/min, which is the rotational speed at which the stirring resistance of the grease with which a space between the hub ring 3 and the outer ring 2 is filled is as small as possible. The rotational speed of the hub ring 3 or the outer ring 2 is preferably set to about 10 rotations/min at which the fluctuation of the rotational torque with respect to the change in the rotational speed becomes the smallest within the range of 2 rotations/min to 60 rotations/min.

In the first rotational torque measurement step (S05), the hub ring 3 or the outer ring 2 is rotated in the range of the small rotational speeds N1 to N2 at which the degree of variation in the rotational torque with respect to a change in the rotational speed is small. Thus, even in a case where the rotational speed of the hub ring 3 or the outer ring 2 changes, the variation in the rotational torque can be minimized and the rotational torque can be measured with high accuracy.

Further, in the first rotational torque measurement step (S05), the rotational torque of the bearing device for a vehicle wheel 1 is measured in a state where the outer-side seal member 10 is fitted to the outer-side opening end of an annular space formed by the outer ring 2 and the hub ring 3. Here, the outer-side seal member 10 is located axially on the opposite side to the small-diameter step portion 3a of the hub ring 3 that is caulked for fixing the inner ring 4. Therefore, even if an abnormality occurs in the inner ring raceway surface 4a or the like in the following caulking step (S06), the seal torque of the outer-side seal member 10 is hardly affected and the rotational torque of the bearing device for a vehicle wheel 1 is also hardly changed.

(Caulking Step)

The caulking step (S06) is performed after the first rotational torque measurement step (S05). In the caulking step (S06), caulking work for caulking an inner-side end portion of the small-diameter step portion 3a of the hub ring 3 to the inner-side end surface 4b of the inner ring 4 is performed. The caulking work can be performed, for example, by swing caulking.

Figure 7:
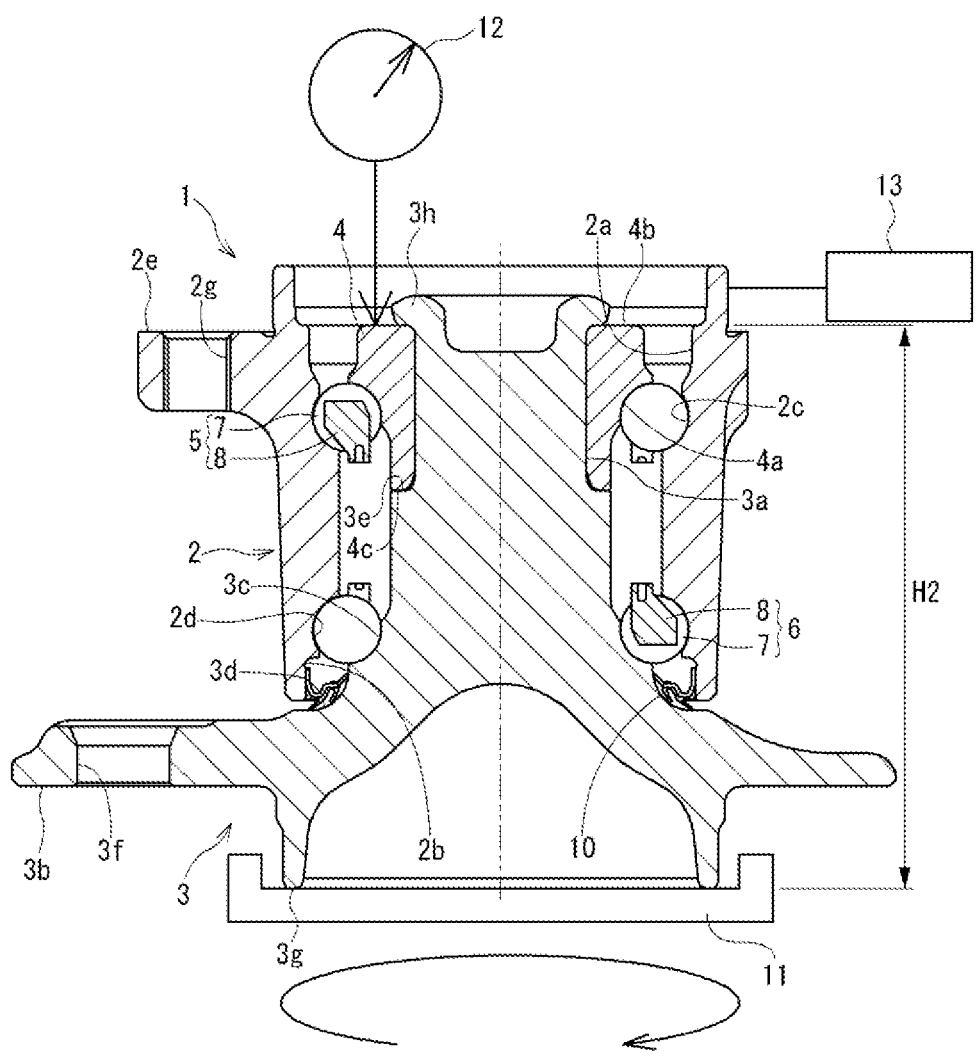
FIG. 7 is a side cross-sectional view illustrating the bearing device for a vehicle wheel in a state where the small-diameter step portion of the hub ring is caulked to the inner ring.

As shown in FIG. 7, after completion of the caulking work on the inner ring 4 of the small-diameter step portion 3a, an axial dimension H2 between the outer-side end surface 3g of the hub ring 3 and the inner-side end surface 4b of the inner ring 4 after completion of the caulking work is measured. Further, a value (H2−H1) obtained by subtracting the axial dimension H1 from the axial dimension H2 indicating an amount of movement in the axial direction of the inner ring 4 from the completion of the press-fitting of the inner ring 4 to the completion of the caulking work of the small-diameter step portion 3a is calculated. From this value (H2−H1) and the first axial negative gap G1, a second axial negative gap G2 between the inner ring 4 and the hub ring 3 after the caulking work is obtained.

Specifically, the second axial negative gap G2 can be calculated, for example, by applying a value (H2−H1) and the first axial negative gap G1 to a relationship between an amount of movement in the axial direction of the inner ring 4 and an amount of change in the axial negative gap between the inner ring 4 and the hub ring 3 which has been obtained, in advance, by an experiment or the like. Note that the relationship between the amount of movement in the axial direction of the inner ring 4 and the amount of change in the axial negative gap between the inner ring 4 and the hub ring 3 can be obtained for each specification of the bearing device for a vehicle wheel 1.

(Second Bearing Preload Value Calculation Step)

The second bearing preload value calculation step (S07) is performed after the caulking step (S06). In the second bearing preload value calculation step (S07), a second bearing preload value P2 applied to the bearing after the caulking work is calculated based on the second axial negative gap G2. The second bearing preload value P2 is calculated by applying the second axial negative gap G2 to a relationship between the axial negative gap and the bearing preload value in the bearing device for a vehicle wheel 1 which has been obtained, in advance, by an experiment or the like. Note that the relationship between an axial negative gap and a bearing preload value can be obtained for each specification of the bearing device for a vehicle wheel 1.

(Second Rotational Torque Measurement Step)

The second rotational torque measurement step (S08) is performed after the second bearing preload value calculation step (S07). In the second rotational torque measurement step (S08), the rotational torque is measured in a state where a dynamic frictional force is generated between the inner members 3 and 4 and the outer member 2, as in the first rotational torque measurement step. In the second rotational torque measurement step (S08), the torque measuring device 13 measures a second rotational torque Tb when the hub ring 3 in which the small-diameter step portion 3a is caulked to the inner ring 4 and the outer ring are relatively rotated. In the second bearing preload value calculation step (S07), the hub ring 3 may be rotated while the outer ring 2 is fixed, or the outer ring 2 may be rotated while the hub ring 3 is fixed.

However, as in the case of the first rotational torque measurement step (S05), it is preferable to rotate the hub ring 3 because the variation in the rotational torque value measured when the rotational speed of the hub ring 3 changes is reduced. Further, also in the second bearing preload value calculation step (S07), the rotational torque can be measured with high accuracy as in the case of the first rotational torque measurement step (S05), by measuring the rotational torque instead of the starting torque of the bearing, and measuring the second rotational torque Tb while the hub ring 3 or the outer ring 2 is rotated at a constant rotational speed at the low rotational speed N1 to N2.

(Third Bearing Preload Value Calculation Step)

The third bearing preload value calculation step (S09) is performed after the second rotational torque measurement step (S08). In the third bearing preload value calculation step (S09), a differential torque ΔT between the first rotational torque Ta and the second rotational torque Tb is calculated. Further, a preload change amount ΔP between after the press-fitting step and after the caulking work is obtained based on the differential torque ΔT, and, further, the preload change amount ΔP is added to the first bearing preload value P1, so that a third bearing preload value P3 is calculated.

Figure 8:
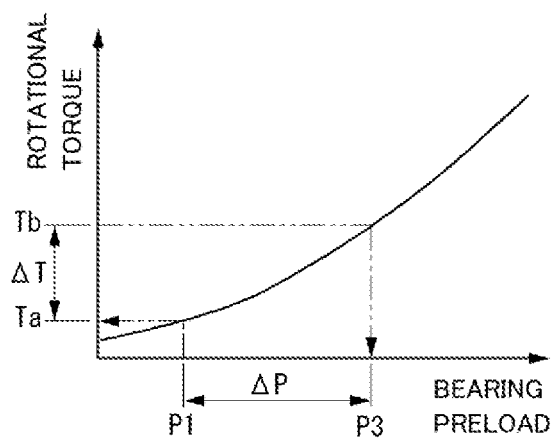
FIG. 8 is a diagram illustrating a relationship between a bearing preload and rotational torque.

In this case, as illustrated in FIG. 8, the preload change amount ΔP is calculated by applying the differential torque ΔT to a relationship between the bearing preload of the bearing device for a vehicle wheel 1 and the rotational torque of the bearing which has been obtained, in advance, by an experiment or the like. Note that the relationship between the bearing preload and the rotational torque of the bearing can be obtained for each specification of the bearing device for a vehicle wheel 1.

(Determination Step)

After the third bearing preload value calculation step (S09), the determination step (S10) is performed. In the determination step (S10), the appropriateness/inappropriateness of the preload applied to the bearing device for a vehicle wheel 1 is determined depending on whether or not a difference between the second bearing preload value P2 and the third bearing preload value P3 is equal to or less than a predetermined threshold. In the determination step (S10), if the difference between the second bearing preload value P2 and the third bearing preload value P3 is equal to or less than a predetermined threshold, the preload applied to the bearing device for a vehicle wheel 1 is determined to be appropriate. If the difference between the second bearing preload value P2 and the third bearing preload value P3 exceeds the predetermined threshold, the preload applied to the bearing device for a vehicle wheel 1 is determined not to be appropriate.

As described above, in the determination step (S10), the second bearing preload value P2 calculated based on the axial gap between the inner ring 4 and the hub ring 3 is checked against the third bearing preload value P3 calculated based on the axial gap between the inner ring 4 and the hub ring 3 and the rotational torque of the bearing device for a vehicle wheel 1 so as to confirm that both the values fall within the range of a preset relative difference. In this manner, the preload value applied to the bearing of the bearing device for a vehicle wheel 1 can be verified with high accuracy.

Here, in a case where the small-diameter step portion of the hub ring is subjected to the caulking work, depending on the magnitude of the caulking load, there is a possibility that the preload is out of an appropriate preload range for ensuring the bearing life of the bearing device for a vehicle wheel. However, according to the preload inspection method for the bearing device for a vehicle wheel 1 according to the present embodiment, whether or not the preload range of the bearing device for a vehicle wheel 1 is appropriate is determined using the bearing preload values before and after the caulking work step, in other words, the second bearing preload value P2 calculated before the caulking work and the third bearing preload value P3 incremented from the preload value P2 after the caulking work step; therefore, it is possible to perform verification with higher accuracy than before. As a result, it is possible to stably supply the bearing device for a vehicle wheel in which the bearing life is ensured.

(Inner-Side Seal Member Mounting Step)

Figure 9:
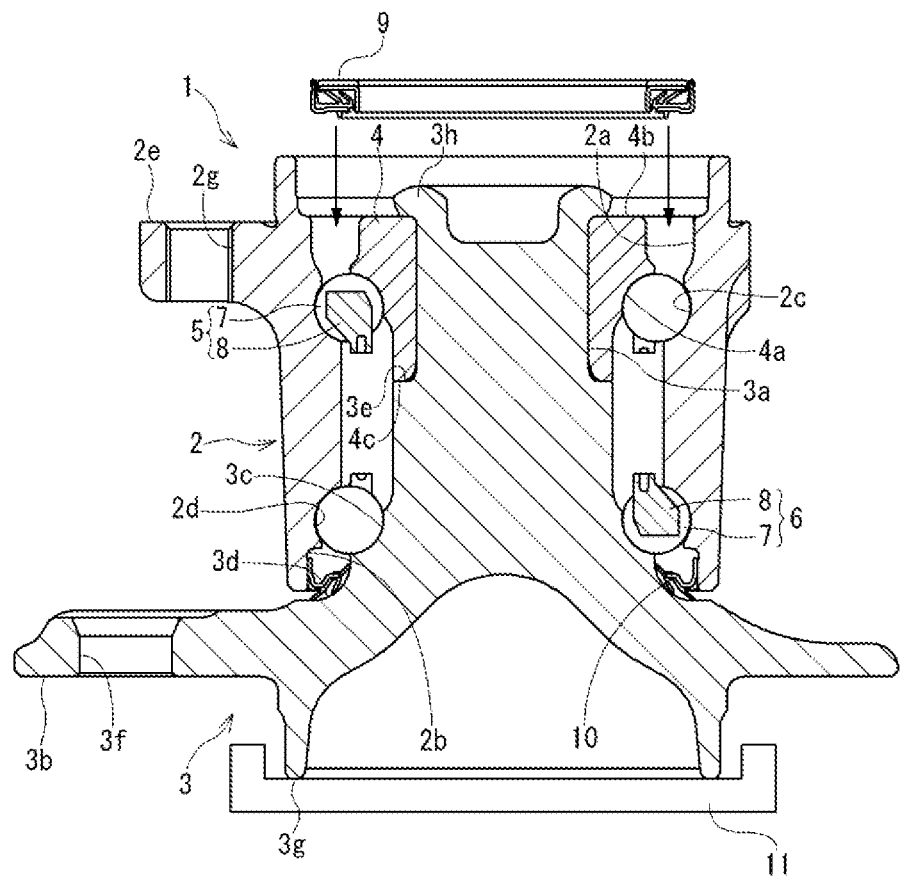
FIG. 9 is a side cross-sectional view illustrating a state in which an inner-side seal member is attached to an inner-side end portion of the outer ring after a second rotational torque measurement step.

The assembling step of the bearing device for a vehicle wheel 1 is completed as the inner-side seal member mounting step (S11) is performed after the third bearing preload value calculation step (S09). That is, the inner-side seal member mounting step (S11) is a part of the assembly method for the bearing device for a vehicle wheel 1. As illustrated in FIG. 9, in the inner-side seal member mounting step (S11), the inner-side seal member 9 is mounted between an inner-side end portion of the outer ring 2 and an inner-side end portion of the inner ring 4 as the inner-side seal member 9 is fitted to the inner-side opening portion 2a of the outer ring 2.

When the inner-side seal member 9 is mounted before the caulking step (S06), the sliding resistance between the outer ring 2 and the inner ring 4 of the inner-side seal member 9 changes depending on the degree of caulking of the hub ring 3 in the caulking step (S06). Further, when the inner-side seal member 9 is mounted before the second rotational torque measurement step (S08) even after the caulking step (S06), the sliding resistance between the outer ring 2 and the inner ring 4 of the inner-side seal member 9 changes depending on a mounting state of the inner-side seal member 9.

Therefore, when the inner-side seal member 9 is mounted before the caulking step (S06) or the second rotational torque measurement step (S08), there is a risk of affecting the variation in the second rotational torque Tb measured in the second rotational torque measurement step (S08). Similarly, in a case where the inner-side seal member 9 is mounted before the first rotational torque measurement step (S05), the mounting state of the inner-side seal member 9 may affect the variation in the first rotational torque Ta measured in the first rotational torque measurement step (S05).

However, in the present embodiment, the inner-side seal member mounting step (S11) is performed after the second rotational torque measurement step (S08); therefore, when the first rotational torque Ta and the second rotational torque Tb of the bearing device for a vehicle wheel 1 are measured in the first rotational torque measurement step (S05) and the second rotational torque measurement step (S08), the variation in the rotational torque due to the influence of the inner-side seal member 9 is not caused, and the rotational torque of the bearing device for a vehicle wheel 1 can be measured with high accuracy.

Note that, although the bearing device for a vehicle wheel 1 for a driven wheel is described in the present embodiment, the present preload inspection method can also be applied to a bearing device for a vehicle wheel for a driving wheel having the specification of performing caulking work of a hub ring.

Although the embodiments of the present invention are described above, the present invention is not limited to such embodiments in any way, and the embodiments are merely an example. As a matter of course, the present invention can be implemented in various forms without departing from the gist of the present invention. The scope of the present invention is indicated by the description of the claims, and further includes the equivalent meaning to and all changes within the scope of the claims.

INDUSTRIAL APPLICABILITY

The present invention can be used for a preload inspection method of a bearing device for a vehicle wheel.

REFERENCE SIGNS LIST

1 bearing device for a vehicle wheel
2 outer ring
2c outer raceway surface (on inner side)
2d outer raceway surface (on outer side)
3 hub ring
3a small-diameter step portion
3c inner raceway surface
4 inner ring
4a inner raceway surface
5 inner-side ball row
6 outer-side ball row
7 ball
9 inner-side seal member
G1 first axial negative gap G2 second axial negative gap
P1 first bearing preload value
P2 second bearing preload value
P3 third bearing preload value
S02 press-fitting step
S03 first bearing preload value calculation step
S04 lubrication step
S05 first rotational torque measurement step
S06 caulking step
S07 second bearing preload value calculation step
S08 second rotational torque measurement step
S09 third bearing preload value calculation step
S10 determination step
S11 inner-side sealing member mounting step
Ta first rotational torque
Tb second rotational torque
ΔT differential torque
ΔP preload change amount

The invention claimed is:

1. A preload inspection method for a bearing device for a vehicle wheel including:
   an outer member having two rows of outer raceway surfaces on an inner periphery;
   an inner member including a hub ring that has a small-diameter step portion extending in an axial direction on an outer periphery and an inner ring that is press-fitted into the small-diameter step portion of the hub ring, the inner member having two rows of inner raceway surfaces facing the two rows of outer raceway surfaces; and
   a plurality of rows of rolling bodies rollably accommodated between both the outer raceway surfaces of the outer member and the inner raceway surfaces of the inner member, the preload inspection method comprising:
   a press-fitting step of press-fitting the inner ring into the small-diameter step portion of the hub ring to a position where the inner ring abuts on the hub ring in the axial direction;
   a first bearing preload value calculation step of calculating a first bearing preload value of the bearing device for the vehicle wheel based on a first axial negative gap between the inner ring and the hub ring after the press-fitting step;
   a first rotational torque measurement step of measuring a first rotational torque of the bearing device for the vehicle wheel when the inner member and the outer member are relatively rotated after the press-fitting step;
   a caulking step of caulking an inner-side end portion of the small-diameter step portion to the inner ring after the first rotational torque measurement step;
   a second bearing preload value calculation step of calculating a second bearing preload value of the bearing device for the vehicle wheel based on a second axial negative gap between the inner ring and the hub ring after the caulking step;
   a second rotational torque measurement step of measuring a second rotational torque of the bearing device for the vehicle wheel when the inner member and the outer member are relatively rotated after the caulking step;
   a third bearing preload value calculation step of calculating a third bearing preload value by adding, to the first bearing preload value, a preload change amount after the press-fitting step and after the caulking step, the preload change amount being obtained based on a differential torque between the first rotational torque and the second rotational torque; and
   a determination step of determining appropriateness/inappropriateness of a preload applied to the bearing device for the vehicle wheel depending on whether or not a difference between the second bearing preload value and the third bearing preload value is equal to or less than a predetermined threshold.

2. The preload inspection method for the bearing device for the vehicle wheel according to claim 1, wherein
   a space between the hub ring and the outer member is filled with grease, and
   the preload inspection method further comprises a lubrication step performed between the press-fitting step and the first rotational torque measurement step, the lubrication step being a step of relatively rotating the inner member and the outer member to lubricate the rolling body with the grease.

3. The preload inspection method for the bearing device for the vehicle wheel according to claim 1, wherein, in the first rotational torque measurement step and the second rotational torque measurement step, an outer-side seal member is fitted to an outer-side opening end of an annular space formed by the outer member and the inner member.

4. The preload inspection method for the bearing device for the vehicle wheel according to claim 1, wherein, in the first rotational torque measurement step and the second rotational torque measurement step, the first rotational torque and the second rotational torque are measured by relatively rotating the inner member and the outer member at a rotational speed between 2 rotations/min and 60 rotations/min.

5. An assembly method for a bearing device for a vehicle wheel, the assembly method comprising:
   the preload inspection method of claim 1; and
   an inner-side seal member mounting step of mounting an inner-side seal member on an inner-side end portion of the outer member, the inner-side seal member mounting step being performed after the second rotational torque measurement step.

* * * * *